(12) United States Patent
Harif

(10) Patent No.: US 7,133,842 B2
(45) Date of Patent: Nov. 7, 2006

(54) SYSTEM, METHOD AND PROGRAM FOR BIDDING FOR BEST SOLUTION PROCESS EXECUTION IN A HETEROGENEOUS NETWORK

(75) Inventor: Shlomi Harif, Austin, TX (US)

(73) Assignee: International Business Machines Corporation, Armonk, NY (US)

( * ) Notice: Subject to any disclaimer, the term of this patent is extended or adjusted under 35 U.S.C. 154(b) by 1166 days.

(21) Appl. No.: 09/752,072

(22) Filed: Dec. 29, 2000

(65) Prior Publication Data

US 2002/0087613 A1   Jul. 4, 2002

(51) Int. Cl.
*G06Q 40/00* (2006.01)

(52) U.S. Cl. ............... 705/37; 705/1; 705/7; 705/8; 703/22; 713/168; 718/102; 718/107

(58) Field of Classification Search ............ 705/37, 705/1, 8, 10, 7; 703/22; 713/168; 718/102, 718/107
See application file for complete search history.

(56) References Cited

U.S. PATENT DOCUMENTS

| | | | | |
|---|---|---|---|---|
| 5,283,896 | A * | 2/1994 | Temmyo et al. | 718/104 |
| 5,905,975 | A * | 5/1999 | Ausubel | 705/37 |
| 6,026,383 | A * | 2/2000 | Ausubel | 705/37 |
| 6,088,732 | A * | 7/2000 | Smith et al. | 709/229 |
| 6,266,805 | B1 * | 7/2001 | Nwana et al. | 717/104 |
| 6,343,277 | B1 * | 1/2002 | Gaus et al. | 705/37 |
| 6,442,141 | B1 * | 8/2002 | Borella et al. | 370/248 |
| 6,473,401 | B1 * | 10/2002 | Kong et al. | 370/229 |
| 6,507,562 | B1 * | 1/2003 | Kadansky et al. | 370/216 |
| 6,542,808 | B1 * | 4/2003 | Mintz | 701/117 |
| 2001/0042123 | A1 * | 11/2001 | Moody et al. | 709/226 |
| 2003/0101124 | A1 * | 5/2003 | Semret et al. | 705/37 |
| 2004/0010592 | A1 * | 1/2004 | Carver et al. | 709/226 |

OTHER PUBLICATIONS

U.S. Appl. No. 60/203,849.*
Qiang et al., "A Dynamic task scheduling method in cluster of workstations," Jan. 1999, abstract only.
Jackson, "NIH Finds Power in Numbers," Aug. 1998, 3 pgs.
Bredin et al., "Utility Driven Mobile-Agent Scheduling Dartmouth Technical Report PCS-TR98-331," Oct. 1998, pp. 1-18.
Feridun et al., "A Framework for Distributed Management with Mobile Components," Jun. 2000, pp. 1-23.
Yan et al., "Performance bottlenecks and potentials of parallel computing on networks of workstations," 1997, pp. 1045-1056.
Bredin, "Market-Based Mobile-Agent Planning: A Thesis Proposal," Jun. 1999, 41 pgs.

* cited by examiner

*Primary Examiner*—Bradley B. Bayat
(74) *Attorney, Agent, or Firm*—Kevin L. Daffer; Daffer McDaniel, LLP; Jeffrey S. LaBaw

(57) ABSTRACT

In a system, method and program for bidding for a best solution process execution in a heterogeneous network, a network client provides a request to a network server for process execution. The network server simulates the process execution and provides the simulation results to network hosts in the form of bid solicitations. An embodiment of the method includes providing a payload that characterizes the requested process execution to a network server. The server simulates the requested processing, and solicits and analyzes bids from network hosts for the process execution while maintaining anonymity as to the identities of the network host and the network client. An embodiment of the system includes a network server operably coupled to the network client and the network host, wherein the network server is adapted to receive and simulate a process execution request, and solicit and analyze bids submitted by network hosts for the process execution.

30 Claims, 9 Drawing Sheets

Network Client Program
Instructions 42

| 421 | Source Identification Packet Creation Program |
| 422 | Payload Creation Program |
| 423 | Task Identity Receiving Program |
| 424 | Financial Charge Receiving Program |
| 425 | Encryption/Decryption Program |

FIG. 2

Network Server
Program Instructions 52

| | |
|---|---|
| 521 | Payload Receiving Program |
| 522 | Payload Evaluation Program |
| 523 | Process Creation Program |
| 524 | Binding Program |
| 525 | Encryption/Decryption Program |
| 526 | Process Simulation Program |
| 527 | Bid Solicitation Program |
| 528 | Confidentiality Program |
| 529 | Mediation Program |
| 530 | Bid Receiving Program |
| 531 | Bid Validation Program |
| 532 | Bid Evaluation Program |
| 533 | Payload Conformance Program |
| 534 | Payload Profile Program |
| 535 | Payload Authentication Program |
| 536 | Agent Instantiation Program |
| 537 | Agent Resource Requirement Estimation Program |
| 538 | Process Awarding Program |
| 539 | Agent Awarding Program |

FIG. 4

Financial Resolution Center
Program Instructions 72

| | |
|---|---|
| 721 | Certificate Authority Program |
| 722 | Accounting Program |
| 723 | Monitoring Program |
| 724 | Financial Charge Receiving Program |
| 725 | Financial Charge Assigning Program |
| 726 | Financial Charge Resolving Program |
| 727 | Confidentiality Program |
| 728 | Financial Account Maintenance Program |
| 729 | Encryption/Decryption Program |
| 730 | Authentication Program |
| 731 | Source Identification Data Packet Receiving Program |
| 732 | Source Identification Data Packet Evaluation Program |
| 733 | Task Identity Creation Program |
| 734 | Client Identity Validation Program |
| 735 | Credit Verification Program |
| 736 | Network Membership Program |
| 737 | Credit Extension Program |
| 738 | Payload validation Program |
| 739 | Task ID Validation Program |
| 740 | Rate Tracking Program |
| 741 | Transaction Number Minimization Program |

FIG. 6

SYSTEM, METHOD AND PROGRAM FOR BIDDING FOR BEST SOLUTION PROCESS EXECUTION IN A HETEROGENEOUS NETWORK

RELATED APPLICATIONS

This application is related to the following co-pending applications filed on even date herewith "System, Method and Program for Creating and Distributing Processes in a Heterogeneous Network," "System, Method and Program for Creating an Authenticatable, Non-repudiatable Transactional Identity in a Heterogeneous Network," "System, Method and Program for Enabling an Electronic Commerce Heterogeneous Network," and "System, Method and Program for Identifying and Binding a Process in a Heterogeneous Network," all by inventor Shlomi Harif.

BACKGROUND OF THE INVENTION

1. Field of the Invention

This invention relates to networks of computational devices, and more particularly to bidding for a best solution execution using such a network.

2. Description of the Related Art

The following descriptions and examples are not admitted to be prior art by virtue of their inclusion within this section.

The continuing proliferation of powerful, convenient computational devices has been accompanied by an increase in the use of networks connecting these devices. Computational devices include computers and other, often portable, devices. Computers may include, but are not limited to, desktop personal computers, laptop personal computers, mainframes, minicomputers, file servers, database servers, and supercomputers. Other portable devices may include wireless telephones, personal digital assistants, automobile-based computers, neurobiological devices, and nanotechnology devices. "Computer," as used herein, may refer to any of such computational devices. The networks connecting computational devices may be "wired" networks, formed using "land lines" such as copper wire or fiber optic cable, wireless networks employing earth and/or satellite-based wireless transmission links, or combinations of wired and wireless network portions. Many networks are organized using a client/server architecture, in which "server" computational devices manage resources, such as files, peripheral devices or processing power, which may be requested by "client" computational devices. A user of the network often operates the client device. Computational devices not operated directly by a user, such as "hosts" which act on behalf of other machines, may act as either clients or servers.

Currently a very widely used network is the Internet. The Internet is a global network of computational devices, which communicate using a format, or protocol, called TCP/IP (transmission control protocol/Internet protocol). The Internet is a heterogeneous network, or a network that connects computers using different executable software from different manufacturers that operate using a variety of platforms. A platform is the underlying hardware or software for a computer. For example, the platform might be an Intel 80486 processor running DOS Version 6.0. The platform could also be UNIX machines on an Ethernet network or an IBM System 390 mainframe computer cluster. The platform, or operating system, defines a standard around which a computer and its software are developed. The term "cross-platform" refers to applications, formats, or devices that work on different platforms, where a device is any machine or component that connects to a computer. For example, a cross-platform programming environment allows a programmer to develop programs for many platforms at once. The Internet is a cross-platform environment.

An important feature of the Internet is that it is substantially free of central organization; that is, the Internet is decentralized by design. A computer can be connected to the Internet easily and at relatively low cost. Each Internet computer is independent. Its operators can choose which Internet services to use and which files, devices, and other resources to services to make available to the global Internet community. This decentralization allows extremely wide access, theoretically enabling any user of the Internet to access any other user. For example, another user could be reached through standard HTTP communication. HTTP, short for HyperText Transfer Protocol, is the underlying protocol used by the Internet. Each computer has a network address typically known as a Uniform Resource Locator, or URL. In order for an Internet user to contact another computer, the Internet user must know the URL of the computer to be accessed. Typically, an Internet user would enter the URL into their browser, which would in turn send an HTTP command to a Web server requesting access to the server whose domain name is contained within the entered URL. Thus, a computer-based browser software controls the client end at the web application. Using TCP/IP, the browser issues HTTP requests to the host server. The browser can request a specific web page or it can ask the host server to perform a database query. In either instance, the request is broken into HTTP packets that are sent across the TCP/IP communications infrastructure to the host computer. Wireless devices employ other, analogous protocols.

Servers typically restrict the type and scope of access available to the global Internet community. For example, the server may only allow access in that it will return a requested "web page." A web server would typically not want to allow a remote user to access its resources for a variety of reasons. For example, a web server would not want an outside user to consume its computing resources or corrupt its data. A web server may wish to allow more extensive access to a known and trusted user. However, security is of utmost concern. Therefore, prior to allowing more extensive access, a web server would require authentication of the user or process requesting access. Authentication is the verification or validation of the identity of a requesting person or process. Authentication may take the form of a digital signature. A digital signature may comprise extra data appended to a message, which identifies and authenticates the sender and message data using public-key encryption.

Public key encryption is a security scheme wherein each user gets a pair of keys, called the public key and the private key. Each user's public key is published while the private key is kept secret. Messages are encrypted using the intended recipient's public key and can only be decrypted using his private key. The need for sender and receiver to share secret information (keys) via some secure channel is thus eliminated: all communications involve only public keys, and no private key is ever transmitted or shared. As stated above, public key encryption is often used in conjunction with a digital signature. For example, a digital signature may be employed by use of a public one-way hash function. The sender uses a one-way hash function to generate a hash-code of about 32 bits from the message data. A hash-code is a number generated from a string of text; in this case the text is message data. A hash-code is generated by a formula in such a way that it is extremely unlikely that some other text will produce the same hash-code. After generating the hash-code, the sender then encrypts the hash-code with his private key. The sender also encrypts the message data itself with his private key and sends it with the hash-code. The receiver decrypts the received hash-code and the message data with the sender's public key and recomputes the hash-code from the message data. If the two hash-codes are equal, the receiver can be sure that data has not been corrupted and that it came from the given sender.

One system of public key encryption is PKI, or Public Key Infrastructure. PKI uses digital certificates from Certificate Authorities. A digital certificate is an attachment to an electronic message used for security purposes. The most common use of a digital certificate is to verify that a user sending a message is who he or she claims to be, and to provide the receiver with the means to encode a reply. A user wishing to send an encrypted message applies for a digital certificate from a Certificate Authority (CA). The CA issues an encrypted digital certificate containing the applicant's public key and a variety of other identification information. The user will decrypt the digital certificate issued by the CA using the CA's public key. The CA makes its own public key readily available.

Certificate Authorities are trusted third-party organizations or companies that issue public/private key pairs and digital certificates used to create digital signatures. The role of the CA in this process is to guarantee that the user granted the unique certificate is, in fact, who he or she claims to be. Usually, this means that the CA has an arrangement with a financial institution, such as a credit card company, which provides it with information to confirm a user's claimed identity. In some cases, a CA may be an internal organization such as a corporate MIS department. CAs are a critical component in data security and electronic commerce because they guarantee that the two parties exchanging information are really who they claim to be. For example, CAs verify and authenticate the validity of each party involved in an electronic transaction. PKIs are currently evolving and there is neither a single PKI nor even a single agreed-upon standard for setting up a PKI. However, reliable PKIs are necessary before electronic commerce can become widespread.

Conducting business via the Internet constitutes one form of electronic commerce. This includes, for example, buying and selling products with digital cash. Digital cash is a system that allows a person to pay for goods or services by transmitting a number from one computer to another. Like the serial numbers on real dollar bills, the digital cash numbers are unique. Each one is issued by a bank and represents a specified sum of real money. One of the key features of digital cash is that, like real cash, it is anonymous and reusable. That is, when a digital cash amount is sent from a buyer to a vendor, there is no way to obtain information about the buyer. This is one of the key differences between digital cash and credit card systems. Another key difference is that a digital cash certificate can be reused.

Digital cash transactions are expected to become commonplace. However, there are a number of competing protocols, and it is unclear which ones will become dominant. Most digital cash systems start with a participating bank that issues cash numbers or other unique identifiers that carry a given value, such as five dollars. To obtain such a certificate, you must have an account at the bank; when you purchase digital cash certificates, the money is withdrawn from your account. You transfer the certificate to the vendor to pay for a product or service, and the vendor deposits the cash number in any participating bank or retransmits it to another vendor. For large purchases, the vendor can check the validity of a cash number by contacting the issuing bank.

Currently, Internet purchases are commonly made using credit cards. These transactions are made more secure by the use of "secure servers." The majority of Web servers conducting electronic commerce are "secure servers" meaning that they support any of several major network security protocols, such as SSL (secure socket layer), that encrypt and decrypt messages to prevent third party tampering. Consequently, a user's payment or personal information can be translated into a secret code that's difficult to crack. The proliferation of the use of computing devices has seen a corresponding proliferation of electronic financial transactions. However, such transactions have not been without the need for improvement. For example, a need exists for increased security and anonymity. Further, a need exists for non-repudiatable fiscal responsibility for the purchase of goods and services. It would therefore be desirable to create a system, method, and program to provide increased security, anonymity, and non-repudiatable fiscal responsibility to electronic commerce.

The continuing proliferation of powerful, convenient computational devices has also been accompanied by an increase in the number and types of users of such devices. The use of computational devices has become commonplace. A majority of individuals and virtually all businesses use at least one type of computational device. Not only has the number of users of computational devices increased, each user's demand for computational resources has also increased. Users are identifying an increasing number of uses for computational resources. However, these resources may be very expensive to acquire and maintain. Historically, only large institutions, such as banking institutions, scientific communities, and other large entities, have utilized extensive computing resources. Such large institutions typically own and maintain vast resources that may spend a significant amount of time idle in order to provide sufficient capacity for peak processing times. It would be desirable for these entities to sell the excess capacity in a way that maintains security. It would also be desirable to develop a system, method, and program allowing a user to execute processes without requiring the user to increase resources for such execution. As used herein, processes or, in the singular, process refers to any executable datum or sequences of executable data, algorithms, file transfers, fetch, get, or similarities to computer manipulated, administrated, maintainable, and/or executable data existing in any form whatsoever. For example, it would be desirable to provide the ability to perform intensive data processing to users who, on their own, would never be able to buy, maintain or staff the data centers necessary to perform intensive data processing. Reducing or eliminating high-capacity server farms or large-scale IT equipment, as well as the need to operate such equipment within secured facilities, would also be desirable. A system, method, and program to create an authenticatable, non-repudiatable transactional identity, which could be utilized to acquire secure and anonymous processing, is therefore desirable. A system, method, and program for identifying and binding a process, which could also be utilized to acquire secure and anonymous processing, is likewise desirable. Creating a system, method, and program for enabling an electronic commerce network would also be desired, as would a system method and program for bidding for a best solution process execution in said network. The desired method would maintain security and anonymity for all involved while providing non-repudiatable financial accounting and account resolution.

SUMMARY OF THE INVENTION

The problems outlined above are in large part addressed by a system, method, and program for allowing a client to utilize the resources of a host where the client and host reside on a heterogeneous network. Utilizing resources could include creating, distributing, and executing processes in a secure manner in which non-repudiatable fiduciary responsibilities could exist. For example, a client could request process execution on a host by providing data to a third, mutually trusted member of the heterogeneous network. This third member could be a network server. This network server could also either be a financial institution or could communicate directly with a financial institution. The client could be fiscally responsible to each member of the heterogeneous network required to execute the process. The network server may also act as an intermediary between the client and the host in negotiating a price for the execution of the process. The server could provide the process to be executed to a network host. This may be accomplished by "binding" the information provided by the client with programming instructions to create independent mobile processing robots, or agents. These agents could be propagated to the host. The processing of the agent could be secure, as the server could carefully examine the data and its associated processing instructions prior to propagation. The agent could be packaged such that the required processing could execute without violating the host's security. Consequently, the agent would not be able to violate the security of the host, the agent could execute as a virtual machine. Further, the host would not be able to access the client's executing process. Therefore, the host would not access the client's data, nor would the client's executing process affect the host's processes or integrity. Also, the client and the host could each remain anonymous.

BRIEF DESCRIPTION OF THE DRAWINGS

Other objects and advantages of the invention will become apparent upon reading the following detailed description and upon reference to the accompanying drawings in which:

FIG. 2 is a block diagram illustrating an embodiment of network client program instructions.

FIG. 4 is a block diagram illustrating an embodiment of network server program instructions.

FIG. 6 is a block diagram illustrating an embodiment of financial resolution center program instructions.

Figure 1:
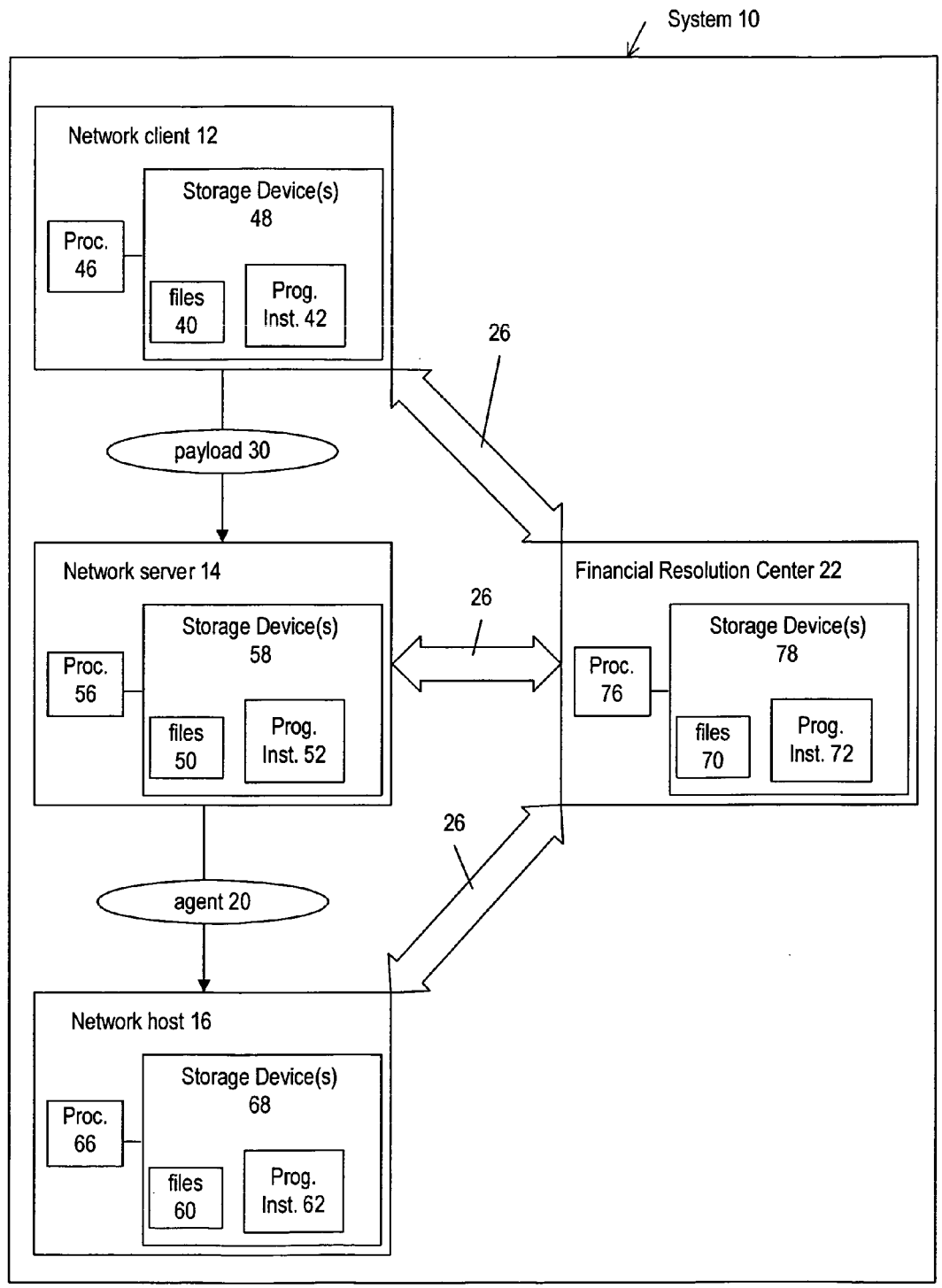
FIG. 1 is a block diagram illustrating an embodiment of a heterogeneous network including a financial resolution center.

While the invention is susceptible to various modifications and alternative forms, specific embodiments thereof are shown by way of example in the drawings and will herein be described in detail. It should be understood, however, that the drawings and detailed description thereto are not intended to limit the invention to the particular form disclosed, but on the contrary, the intention is to cover all modifications, equivalents and alternatives falling within the spirit and scope of the present invention as defined by the appended claims.

DETAILED DESCRIPTION OF THE PREFERRED EMBODIMENTS

An embodiment of a system 10 for utilizing resources available via a network is illustrated in FIG. 1. System, or network, 10 is a heterogeneous network. A heterogeneous network is one that interconnects an assortment of computational devices running a variety of platforms. In the embodiment of FIG. 1, the heterogeneous network is connecting network client 12, network server 14, network host 16, and financial resolution center 22. The network client 12, network server 14, network host 16, and financial resolution center 22 may or may not each be a different type of computational device. That is, "client," "server," "host," and "financial resolution center" describe only the function performed by the computational device. Further, "client," "server," "host," and "financial resolution center" may each describe plural computational devices. In the embodiment of FIG. 1, network 10 is the Internet, and may include millions of computational devices. Transmission media 26 are used to connect the client, server, host, and financial resolution center to network 10, which includes other transmission media and computational devices interconnected all over the world. Transmission medium 26 may be used to connect network client 12 to other computational devices, such as additional network client devices 12 and/or additional network servers 14. Transmission medium 26 may include, for example, a wire, cable, wireless transmission path, or a combination of these. Protocols used for transmission along transmission medium 26 may include TCP/IP, HTTP, and/or other suitable protocols such as Wireless Applications Protocol (WAP).

Network client 12 is a computational device, which may be, for example, a personal computer. In the embodiment of FIG. 1, network client 12 includes processor 46 and storage device (or devices) 48. Storage device, or storage medium, 48 may take many forms, such as volatile or nonvolatile memory, a magnetic disk such as a hard drive or floppy drive, an optical disk, and/or a magnetic tape. Such a storage device is sometimes referred to as a "direct access storage device" (DASD). Storage device 48 may in some embodiments be a combination of more than one storage device. In the embodiment of FIG. 1, storage device 48 includes files 40 and program instructions 42, also referred to as program executables. The program instructions are typically stored as "executable files" in a storage device and loaded into system memory during execution. The program instructions may include algorithms used to process data sets.

Files 40 may include data sets, security information, and financial information. Security information may include encryption and decryption information. Security information may also include access information. Financial information may indicate ability and willingness to pay for services of varying reliability and speed. Financial information may also contain financial security information such as account identifying information. Files 40 may also include other files suitable for use in communicating across the network or in identifying stored information accessible using the network. For example, a file including a set of programming instructions used to access a remote data set may be included in files 40.

Program instructions 42 may include various program instructions used to implement functions of network client 12, such as program instructions used to implement the methods described herein. An embodiment of program instructions 42 is illustrated in FIG. 2. As shown, program instructions 42 may comprise Source Identification Packet Creation Program 421, Payload Creation Program 422, Task Identity Receiving Program 423, Financial Charge Receiving Program 424, or Encryption/Decryption Program 425. Storage device 48 thus includes data and programming instructions used to provide payload 30 to the network server 14. A payload is a specialized set of programming instructions that the network client 12 provides to the network server 14 to request processing. Included with this definition is the concept of wrapping data packets with addressing information, executable instructions, routing instructions, security information, arbitration information, authentication information, packet size, etc. A payload can therefor be deemed data and control information within a wrapped packet of information sent across the heterogeneous network using known packet transmission protocols exiting within the transport layer of the OSI model. "Processing" as used herein may refer to any function, action, or computation that may be accomplished using a heterogeneous network.

In the embodiment illustrated in FIG. 1, the network client 12 (or a user of same) desires the use of additional resources. For example, the network client 12 may need to process a large amount of data. Or the network client 12 may desire to execute a media job to write a number of CDs, or perhaps print a large number of documents. Perhaps the network client 12 needs to make a transmission, for example, to send messages to customers via their cellular phones or to set parameters on a patient's neurobiological device. The network client 12 may desire additional resources to perform any task that may be accomplished using a heterogeneous network as described herein. Thus, the network client 12 presents its request for additional resources to network server 14 in the form of payload 30.

Figure 3:
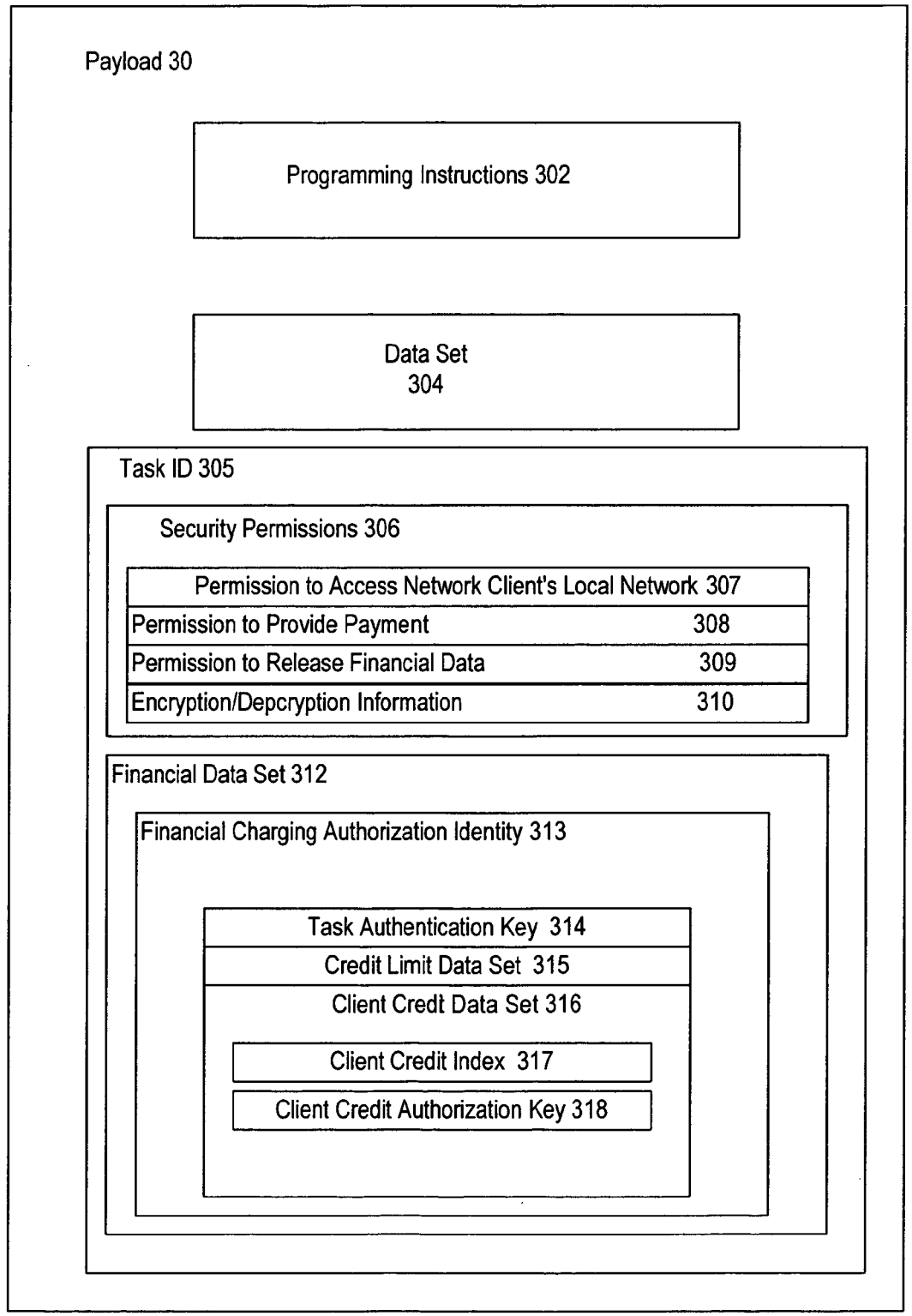
FIG. 3 is a block diagram illustrating an embodiment of a payload.

Payload 30 is shown in the block diagram of FIG. 3. The payload 30 enables the network server 14 to provide a process to the network host 16. Payload 30 provides parameters to define the requested processing. In an embodiment, the payload enables the server to instantiate a certified code object, or agent 20 of FIG. 1. An agent is an automatic software process that may coordinate with other agents to perform some collective task. Agents will be described in more detail below. The payload 30 may be provided to the network server 14 encased in an encryption and authenticated key. In an embodiment, the payload contains a set of programming instructions 302, data set 304, and a task id 305, which contains security permissions 306, and financial data 308.

The data set 304 may contain data, or programming instructions to access a data set, or both. For example, the data to be processed may reside on the client, and the payload 30 may contain only a pointer to the data so it may be accessed at the time of processing. In this case, the security permissions 306 would include a set of network security permissions used to access the network client's data. The security permissions 306 may also include a set of network security permissions to access the network client's resources, as discussed further below. If the data to be processed does not reside on the client, the data set 304 may include instructions to access the data set, and the payload may include the security permissions used to access the data.

The set of network security permissions used to access the networks client's resources may allow access to a wide variety of resources. For example, as mentioned above, it may be necessary or desirable to access data residing on the network client 12. However, it may also be necessary or desirable to access the client's resources for use in executing the desired process. For example, it may be necessary to access the client's peripheral devices in order to return the executed process information to the network client 12. Additionally, the security permissions 306 could include an encryption key. The security permissions 306 may include programming instructions for creating, for example, special hash-codes of the data strings or one-time use passwords to allow access. A set of financial security permissions used to allow a Financial Resolution Center 22 (FRC) to release limited financial information about the network client 12 to the network server 14 may also be included in security permissions 306. In fact, the permissions may provide authorization for the FRC 22 to provide payment on behalf of the network server 14 upon completion of requested tasks. The Financial Resolution Center is a type of bank or other financial institution with whom each network user may have a pre-established association. The FRC 22 and its functions will be discussed in more detail below.

The payload's set of programming instructions 302 may contain actual programming instructions used to process data, or it may contain a pointer and associated programming instructions allowing access to an existing library of programming instructions or routines which may or may not reside on the network client. The programming instructions 302 may include a statement of a standard process and its parameters. In any case, the set of programming instructions 302 will provide instructions necessary to complete the processing requested by the network client 12. If the set of programming instructions 302 contains actual code, the code will preferably be compiled on the client prior to providing the payload. In such an embodiment, only code compiling without syntax errors is shipped to the network server to be prepared for process execution.

The set of programming instructions 302 may also include a description of the limits of propagation for the requested processing. Propagation may be considered as the dispersal of specific information to a finite number of recipients. For example, the propagation of agents 20 which will be instantiated by the network server 14, as described in detail below, may be defined by programming instructions 302. The propagational limits may incorporate criteria supplied by the network client 12. The scope of the propagation may be time limited. For example, a particular process may execute more quickly if numerous agents 20 are instantiated to complete the process. This may not be true for another process. Thus, the propagation of the agents may be defined by the amount of time the network client 12 allows for the processing to be completed. The scope of the propagation may be geographically limited. For example, the agent 20 could be limited in terms of its physical distance from either the data source or the network client 12. The network client 12 could directly define a distance limitation, or it could be determined by other limitations imposed by the network client 12. For example, the required processing may not allow the increased latency associated with distant or isolated hosts. The absolute number of copies of each agent 20 allowable may also limit the scope of the propagation. In this manner, agents 20 to solve a specific problem may saturate a minimum number of network hosts 16. This may be particularly useful in a situation where the network host 16 does encrypted caching of data required by the agent 20. In this case, limiting the number of network hosts 16 would speed processing of multiple agents 20 using limited amounts of data. Finally, propagation may simply be limited by the agent's completion of the requested processing, or until the agent 20 receives a signal to terminate.

A precision factor may be included in the set of programming instructions 302. In the case of a payload that has requested computational processing, the precision factor may describe the degree of propagational redundancy to be deployed. The greater the desired precision, the more agents will be deployed requesting overlapping or redundant data sets. Therefore, hardware and software redundancy may be employed to ensure a higher degree of accuracy of the completed processing. The precision factor may be used to verify successful completion of any requested process. For example, if the process requests data transmission, a precision factor may indicate that reciprocal transmissions are required to acknowledge receipt of the transmission.

The payload also includes financial data 308, which may include a cost-accounting reference indicating how each agent's activities are to be charged (or how the process is to be charged if agents are not used). The propagational limits may or may not be associated with a cost-accounting reference. For example, the network client 12 may only have a limited amount of funds to pay for executing the process, or the network client 12 may need fast, reliable execution at any price. In either case, the propagation of the agent 20 would be affected by the payload's constraints. If the propagation of the agents involves numerous, distinct tasks, the client may want individual sub-accounts to be charged. Financial data 308 may also include account information and payment authorization information.

Returning to FIG. 1, the payload 30 is received by network server 14. Network server 14 is a computational device that may be, for example, a dedicated network server. Alternately, the network server 14 could be running a multiprocessing operating system, which would allow a single computer to execute several programs at once. In this case, the network server 14 could refer to the program that is receiving the payload rather than the entire computer. In the embodiment of FIG. 1, network server 14 includes processor 56 and storage device (or devices) 58. Files 50 and program instructions 52 may be included in storage device 58. As shown in the embodiment of FIG. 4, program instructions 52 may include various programs used to implement functions of network server 14, such as program instructions used to implement the methods described herein. For example, program instructions 52 may include instructions regarding the analysis of payload 30 or the instantiation of agent 20. Storage device 58 may also include data and programming instructions used to provide a process, referred to as agent 20 in this embodiment, to the network host 16.

Upon receipt of the payload 30, the network server 14 may perform a number of functions. Initially, the network server 14 verifies the payload is from a known client. This authentication procedure, and the network security it may provide, will be discussed in further detail in sections that follow. Although the network server may know the identity of the host and the client, the network server does not disclose this information. The network client and the network host remain unknown to each other. In an embodiment, the network client, network host, and network server may all remain unknown to each other. Once the payload 30 has been authenticated, the network server 14 may examine the payload 30 for conformance to network protocols. For example, the network server may determine that the payload is in the correct format. Upon verification of conformance, the network server 14 may bind a process to be provided to the network host 16 for execution. An examination and binding procedure that may be used in the preferred embodiment will be described fully in sections that follow. In an embodiment, examination would minimally include verifying the presence of all components necessary to instantiate an agent 20.

Prior to providing the process to the network host for execution, the network server 14 may verify with the Financial Resolution Center 22 the network client's financial or fiduciary responsibility for the preparation and execution of the requested process. The network server 14 may negotiate within the heterogeneous network to determine which network host 16 will execute the process. In an embodiment, the network server 14 will solicit bids from network hosts 16 for the execution of the process. The network server will analyze the bids using a variety of parameters. This bidding method will be described in more detail in the sections that follow. The network server provides the process to a network host after determining which network host 16 will execute the process.

Figure 5:
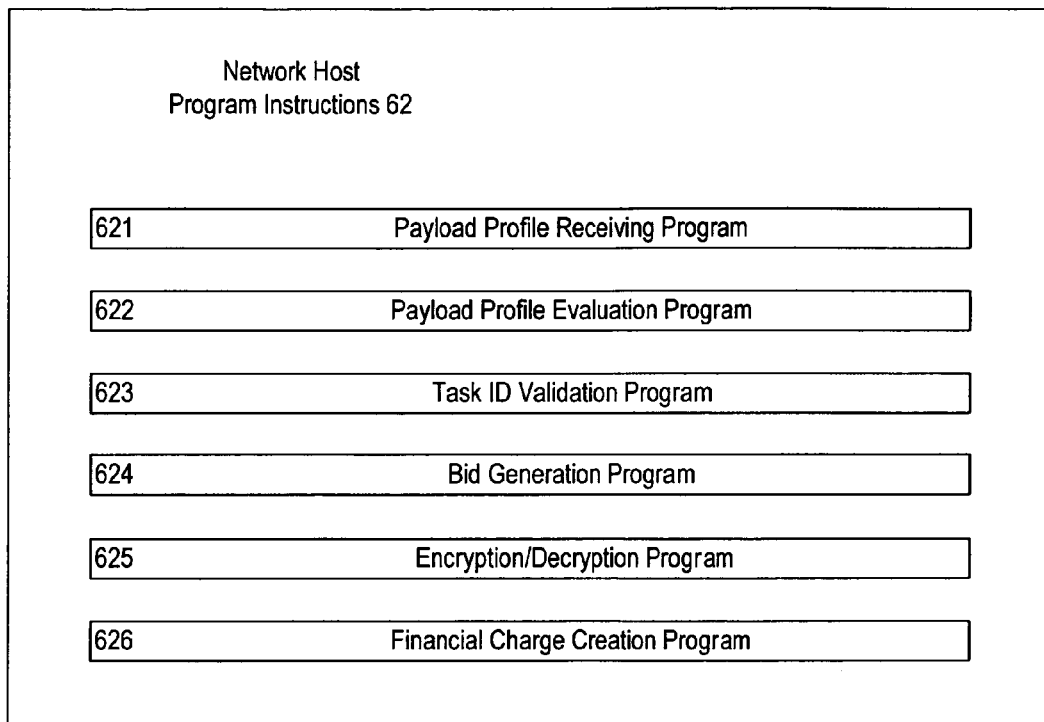
FIG. 5 is a block diagram illustrating an embodiment of network host program instructions.
Figure 7:
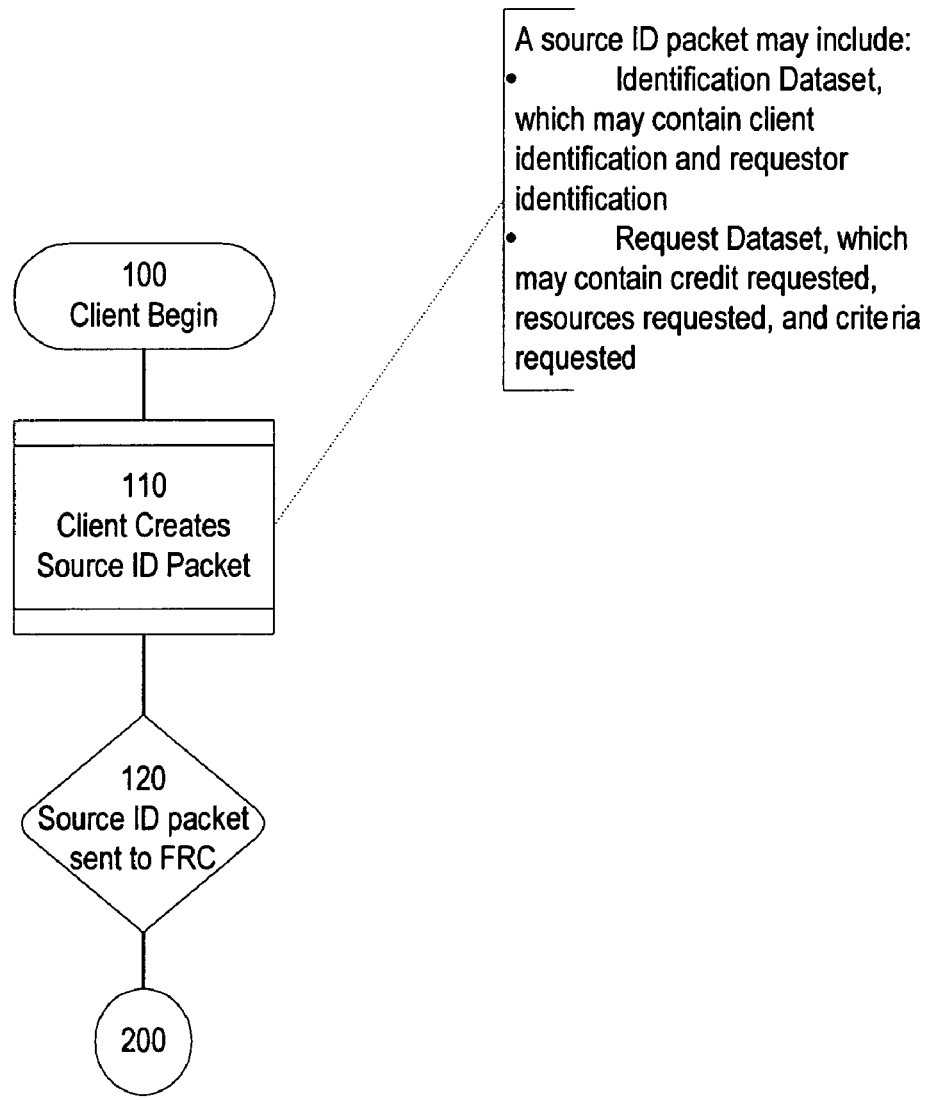
FIG. 7 is a flow chart illustrating an embodiment of a client's request for a task identity.
Figure 8:
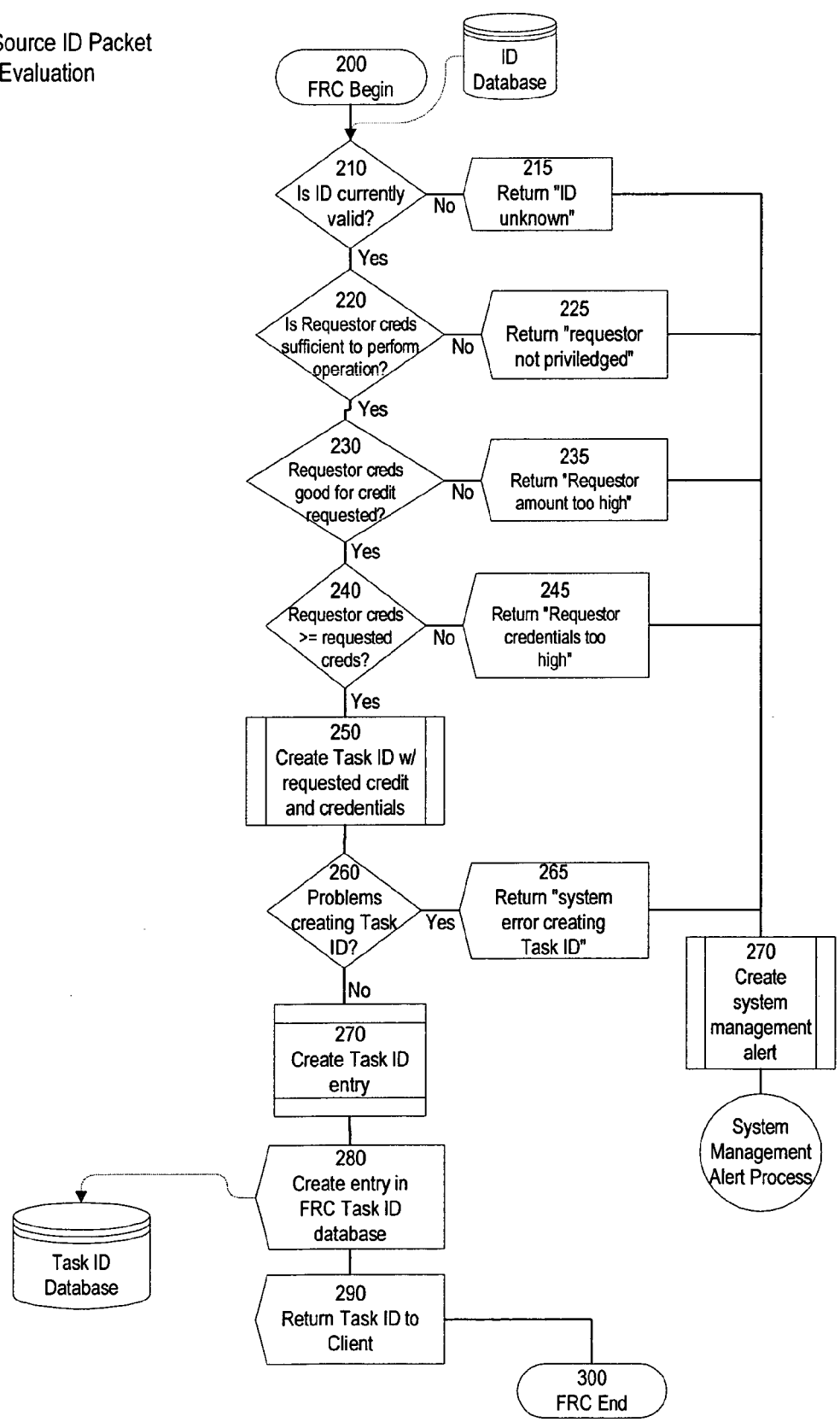
FIG. 8 is a flow chart illustrating an embodiment of a Financial Resolution Center's evaluation of a request for a task identity.

Network host 16 is a computational device, which may be, for example, a workstation. In the embodiment of FIG. 1, network host 16 includes processor 66 and storage device (or devices) 68 in which may be stored files 60 and program instructions 62. Program instructions 62 may include various algorithms used to implement functions of network host 16, such as program instructions used to process agent 20. An embodiment of the various programming instructions that may be employed by the network host 16 is illustrated in FIG. 5. Storage device 68 may also include data and programming instructions used to receive agent 20 from the network server 14.

In a preferred embodiment, the Financial Resolution Center, or FRC, plays an integral role in the network-based processing described herein. The Financial Resolution Center, or FRC, is a central processing location providing all users of the heterogeneous network (clients, servers, hosts, agents, etc.) with a centralized accounting and billing resolution system. This high-volume, transaction-based system may handle billions of micro-transactions as well as high-value, negotiated fund transfers. The main functions of this center may include: Posting and tracking current "market" rates for basic and packed special services; managing a bidding process between network clients and network servers, and between network servers and network hosts; account billing and resolution, solving for minimum number of transactions among participating partners; and managing credit accounting and floating institutions credit in advance of payments or resolution.

Users may apply for membership to the network through FRC, with the FRC determining which users to allow into the network based upon the user's qualifications. For example, a user may be qualified, or accredited, as a client by demonstrating an ability to pay for process execution. A user may be accredited as a host by demonstrating an ability to execute processes. Note that a single user may be accredited more than one type of network membership simultaneously. For example, a user may be a network client and a network host. Further, a single user may have numerous network memberships. For example, a single user may have multiple accredited client memberships and/or host memberships and/or server memberships.

Accredited members of the heterogeneous network thus may register with the FRC. Upon registration, each member is approved for a specific index. For example, a network client may be assigned a specific credit index indicating a corresponding credit limit and/or payment history. The FRC may regularly communicate with each user of the heterogeneous network by providing financial information and reconciling accounts. For example, each time an accredited member posts a charge to the FRC, it may list its own identification, the task ID, and the amount of the charge. These records are kept for billing to the charged entity, (e.g., the owner of a network client such as client 12) and aggregated into the ledger of accounts for each entity. In this manner, payments or billings for a network transaction are made only on the net gain or loss of an entity's organization as calculated by the FRC. The FRC, in turn, collects and dispenses the actual amounts due each entity, further ensuring the anonymity and the non-repudiability of the process. That is, the payee does not know the identity of the payer, nor does the payer know the identity of the payee. Furthermore, the FRC provides the ability for non-repudiatable charges. Prior to delivering goods or services, hosts may have assurance from the FRC that they will be paid. At the end of each billing period, the accumulated debits and credits posted for each accredited institution are resolved, and transaction summaries are sent to each entity, along with either a statement or funds due, depending on the entity's balance of transactions. There may exist a mechanism for non-payment of faulty goods or services, but the network will have a low default rate.

The FRC 22 is a computational device, which may be, for example, a dedicated network server. In the embodiment of FIG. 1, FRC 22 includes processor 76 and storage device (or devices) 78. Storage device 78 is similar to, e.g., storage device 68 as described above. In the embodiment of FIG. 1, storage device 78 includes files 70 and program instructions 72, also referred to as program executables. The program instructions may include algorithms used to process data sets.

Files 70 may include data sets, security information, and financial information. Security information may include encryption and decryption information. Security information may also include access information. Financial information may include account balance information for each user of the heterogeneous network. Financial information may also include credit accounting information. Financial information may also contain financial security information such as account identifying information. Files 70 may also include other files suitable for use in communicating across the network or in identifying stored information accessible using the network. For example, a file including a set of programming instructions used to access a remote data set may be included in files 70. Program instructions 72 may include various program instructions used to implement functions of the FRC 22, such as program instructions used to implement the methods described herein. For example, program instructions 72 may include instructions regarding the reconciliation of user accounts. An embodiment of the various programming instructions 72 that may be employed by the Financial Resolution Center 22 is illustrated in FIG. 6. Storage device 78 may also include data and programming instructions used to provide communications with each user of the heterogeneous network.

Network accountability and security may both be provided through the FRC. Each network client, server, and host is allowed entry to the heterogeneous network by the FRC. Upon initially joining the network, each computational device is certified by the FRC. That is, the FRC may function as a Certificate Authority and provide a new network member with a PKI public/private key pair and a digital signature. All transactions between the hosts, servers, clients, agents, and FRC are key encrypted. Thus, the majority of transmissions within the heterogeneous network have numerous layers of encryption. Although the identities of each network member are known to the FRC, the FRC does not disclose this information. Further, the FRC does not disclose the prices paid by an identifiable source for any resource purchased.

In addition to verifying identity before allowing entry to the network, the FRC may verify capability. For example, the FRC may require that a network client have financial resources, a network host have computing resources, and a network server have estimating and evaluating capabilities before extending network membership to the computational device. The FRC may also require a member to re-certify periodically and re-verify capability. Further, the FRC may also provide a rating of each member's capability with each re-certification. The capability rating of each member may be known to the other members, yet the identity of each member may remain unknown. In this manner, network members have a method by which to differentiate between members in order to determine which members with which to conduct transactions while maintaining network anonymity. In a preferred embodiment, computational devices are re-certified on a repeating basis. Capability may be indicated, for example, with a reliability index for each host, an accuracy index for each server, and a credit index for each client. The reliability index will provide information relating to past process execution history, the accuracy index will provide information relating to past process simulation history, and the credit index will provide information relating to past payment history and credit availability.

In a preferred embodiment, prior to providing a payload to a network server, the network client first requests a task identity from the FRC. For privacy purposes, each task receives a unique identifier to be used until the task completes processing. Referring to FIG. 3, the client creates a source ID packet that is encrypted with the FRC's public key. The source ID packet may contain, for example, company ID, employee ID, resources requested, and budget. The FRC evaluates the source ID packet as represented by the flow chart shown in FIG. 4, and determines whether to award a task identity, or task ID. If awarded, the FRC records an entry in the task ID database. Prior to providing the task ID to the client, the task ID is encrypted with the client's public key. In a preferred embodiment, the task ID includes an authorization indicating the client's line of credit for the execution of the task and may be accompanied with an authentication key and/or a PKI public/private key pair assigned to the task ID. This task ID and its single-use authentication are assigned directly to the resource request associated with the task to be presented by the client. The authentication is single-use because it will expire upon completion or termination of the requested processing or task. That is, the authentication key and/or PKI key pair assigned to the task ID may only be used for the single resource request associated with the task ID. The task ID will contain not only the line of credit but also the credit index of the client. The task ID will also expire upon completion or cancellation of the processing requested by the task ID.

In an embodiment of a method disclosed herein, the network client provides a request for process execution to the network server. The server authenticates the request according to a network client's digital signature, which has been pre-certified as acceptable. This digital signature may include any combination of the following: a certificate, a key, a password, or any other object used to authenticate computational devices. The client's request is provided in the form of a payload, as described above. The payload may be encrypted with the server's public key. In this way, only the server may decrypt the payload. Contained within the payload is the task ID. In order for the network server 14 to verify the payload is from a known, credit-worthy client, the server validates the task ID. The network server 14 contacts the FRC 22 directly to obtain the validation, and upon receipt, the server continues to process the payload. Also contained within the payload, as indicated in sections above, are programming instructions and data. One piece of the data included is the task ID's public key. One section of the programming instructions includes instructions to encrypt any data generated upon completion of the process using the task ID's public key. The task ID's private key has been retained by the network client. Therefore, once computed, only the client that requested the processing can decrypt the data. Thus, security and anonymity may be provided in the present heterogeneous network.

However, the requested data cannot be returned prior to the execution of the requested processing. In order for the processing to occur, the payload is first analyzed and provided to a network host as a job. Therefore, after authenticating the payload and validating the task ID, the network server 14 inspects the payload 30 for conformance to network protocols. In an embodiment, the network client 12 is fiscally responsible to the network server 14 for the server's handling of the payload 30. For example, the network server 14 may request payment via the FRC 22 for the receipt and packaging of the payload. Once payment authorization is received from the FRC 22, the network server 14 continues processing the payload. Each payload may be minimally authenticated with sufficient credit to create, propagate, instantiate, process and terminate. Additional financial authentication can be charged into the instantiated process as per network client request. In an embodiment, the server may be pre-authorized to debit a fee for the inspection of the payload. This inspection could include examining the syntax, or it could include looking for computer viruses. This inspection would include verifying that all components necessary to provide the process are contained within the payload 30. In an embodiment, the inspection verifies the presence of all information necessary to provide an agent is present. As mentioned above, an agent is an automatic process, which may coordinate with other agents to perform some collective task.

Agents may employ a variety of processes. Agents may perform standard, frequently requested processes, and sometimes referred to as "canned" processes, or agents may provide special user defined processes. Both types of agents may work together to accomplish a client-defined process. A custom agent may utilize, or call, canned agents. Additionally, canned agents may call other canned agents. For example, there could be file-sharing agents which provide other agents with data sets or records for processing, and which return processed data to the client. Another type of canned, or standard, agent could be an output formatting agent, providing distributed dissemination of data for printing, digital media mastering, or other output where pre-production processing is done in addition to raw digital output. Another type of standard agent may perform funding authorization, providing additional funding to agents performing activities for pre-approved clients and within pre-approved hosts. An agent may request additional funding from such a funding agent running on the same host. Another type of standard agent may perform access authorization, providing rule-based response to information from authorized agents on the host, in conjunction with the accesses allowed it by the server. Also, there may be standard agents to perform process control, monitoring all affiliated agents running the same process set on the host, responding to events through rules, bounded by their access and control authorizations. Process control agents possess delegated authority from the client as well as the access and authorizations granted by the server, and are funded to pay for special access privileges it may require.

Any data required by the agent must be accessible, wherever it is. While a data set can be included, it would typically either be set at the client, or handled by a separate agent. Canned agents could replicate the data onto a host and act as data servers for other agents. In an embodiment, an agent may access only the data embedded in its payload or brought in via request, so that an agent's utilization of disk and memory resources can be strictly controlled. In such an embodiment, the agent can make no direct resource allocation request of the host beyond allowed memory and disk usage, unless access to another device, for additional use, has been paid for. For instance, a standard printing agent would need to get paid-for, authenticated access to burn 3,000 CD-ROMs at an output-oriented host site, while a special agent would not be able to communicate with anything other than a standard printing agent to do its media output.

An agent 20 may register with the network client 12 that initially requested it, or with the network server 14 that instantiated it. This would allow some agents to act as distributed data set hosts for other agents. The server can manage the agent in some embodiments. This would incur additional cost to the client, but would allow for a more effective control over the agents' activities. Management activities could include dynamic allocation and propagation of agents depending on their progress against a time line and percent complete curve. Management activities could also include process monitoring which could detect and respond to agent failures.

An agent may replicate itself. However, an agent may need authorization from its network host to replicate. A benefit of the method described herein is the ability to provide the security required to allow secure processing within a heterogeneous network. As noted above, the host may not be able to access the client's executing process, nor could the client's executing process affect the host's processes or integrity. In an embodiment, an agent executing on a host would do so as a virtual machine. That is, the agent would be unable to effect change outside its allocated processing environment. However, in the preferred embodiment, the host is unable to ascertain the data and/or code contents executed in the agent's allocated environment. As shown in FIG. 5, an agent's allocated environment may have different processing layers.

Figure 9:
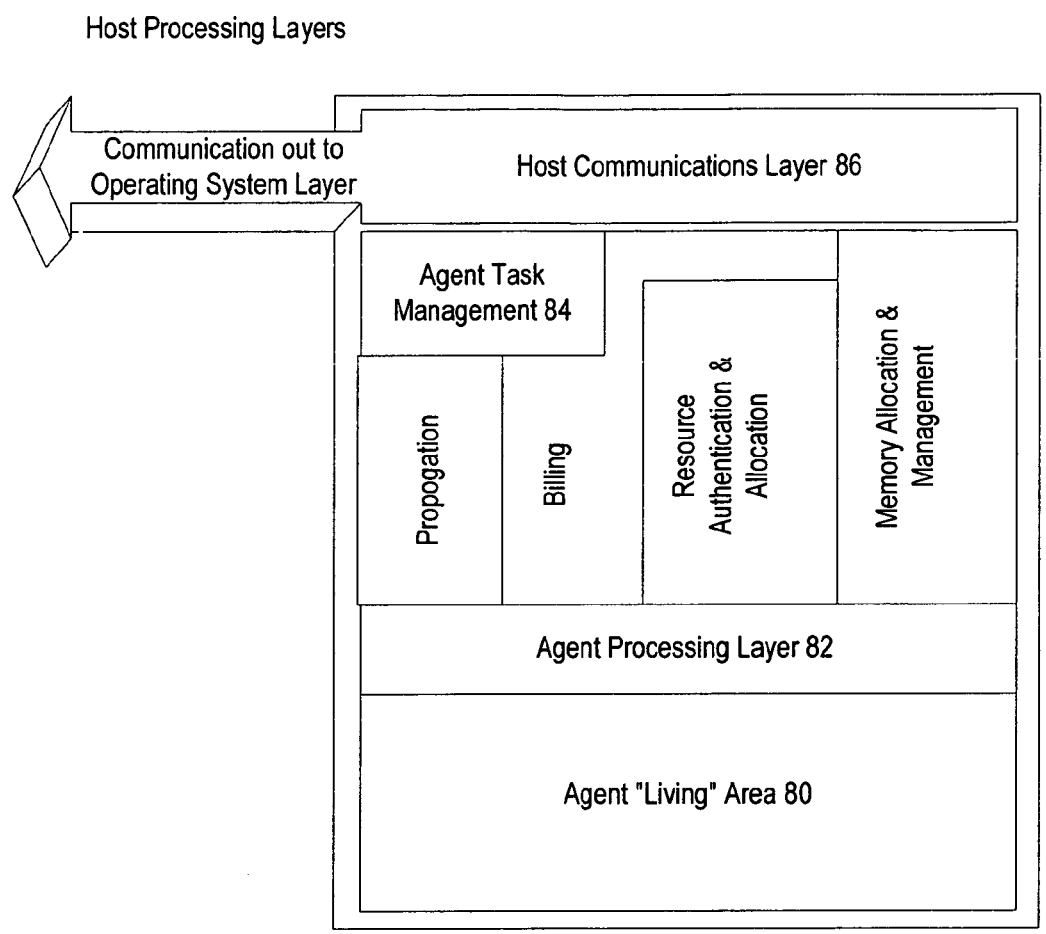
FIG. 9 is a block diagram of an embodiment of the processing layers of an agent and its host.

In addition to an agent's allocated environment, FIG. 9 illustrates an embodiment of the processing layers of a host associated with an agent. Starting at the bottom of the illustration, the agent "living" area 80 is where the agent's task specific computing is performed. The data within area 80 is encrypted in memory using encryption keys provided to the task ID as described above. As the agent computes, it may need to communicate some data outside the living area 80. This communication is performed by first providing the data to the agent processing layer 82. The agent's processing layer 82 may need to recode the data for the agent's task. That is, the processing layer 82 may perform data encryption and decryption on behalf of living area 80. Alternately, the living area 80 may provide data encrypted with the host's public key for security. In any event, the data will be provided to the billing and resource allocation components of the host task management. The host's task management layer 84 may manage the agent's propagation, billing, resource authentication and allocation, and memory allocation and management. The task management layer may provide the data to the host communications layer 86. The Communications Layer 86 may provide the agent with communications with the host itself, another host, the network server, the client, and/or other agents. Agents have no direct access to network APIs (application program interfaces) or resources, Graphical User Interface, or GUI, libraries, direct Input/Output, or I/O, (keyboard or display) streams, or any other external connection point.

The data within area 80 will be packaged for transmission over the host machine's transport layer. If the data is ultimately sent from the host, it will be encrypted with the host's private key prior to propagation to allow recipients to verify their source. The data cannot be discerned without having the keys sufficient to decode the code and data residing in the agent living area 80.

In an embodiment, the agent may query the host as to whether a copy of the agent may be allowed to spawn. If authorized, agents may spawn serially until either funding is depleted or the propagation rules do not trigger additional replication. Therefore, hosts may also propagate instantiations of the agents. Agents are propagated according to the rules embedded in the payloads. Propagated agents are registered into an agent directory. That is, a host may annotate an agent directory immediately upon each instantiation. In this manner, agents may communicate with one another within the host and external to the host. Standard agents are instantiated, registered, and propagated like specialty agents, but may have a higher initial expense allocation, as they instantiate as authorized to communicate with other agents and allocate disk, printer, or other consumable resource allocations on the network host, server, and client as necessary.

An agent may also function as a client and provide a payload, which would ultimately become a process requiring its own parallel processing. The server limits the number of concurrently functioning agent instances. The server acts as the load manager for agents, ensuring that only a given number of them run concurrently. When there is no count limit (e.g., an unlimited agent allocation), the agents may be limited in terms of the funding allocated to each agent as metered by the Financial Resolution Center.

To create an agent, the network server 14 binds the payload 30 with a "bus," thus creating a computing robot or agent 20. An enabling set of functional parameters, software libraries and activating code is collectively referred to herein as the "bus." The bus governs the agent's communication, replication, allocation, propagation, and billing abilities. The bus may include components requested by the programming instructions 302. The bus may also include the level of user or organizational access rights, roles and authentications necessary for the agent to complete its tasks. The combination of payload and the bus may be referred to as the agent 20.

Agents may be instantiated by executing code within the payload. Depending on the funding model, the network host may hold the value limit an agent can instantiate to, or the host may query the server with each instantiation for funding approval. In either case, notification is passed along to the FRC with each instantiation for billing purposes. Additionally, the funding rules may be set up to combine the two models. For example, when funding is exhausted in the former model, the instantiation funding may move to the latter model. Alternately, authorization from the server for a lump sum amount may be sought when funding is exhausted in the former model.

Once instantiated, an agent has the ability to communicate with all agents of the same task ID, across multiple hosts if necessary. All agents of the same task ID may include specialty agents or standard agents. This communication may be enabled through an agent directory, resident at the host, which lists agent tasks and their unique identifiers. This is used for inter-agent communication.

Agents are required to conform to a number of constraints in how they are built to ensure they work only with the set Application Program Interfaces, or APIs, in everything from memory allocation to communication to file access. This may be simplified by writing the agents in a Java-like language. In a preferred embodiment, agents may not be linked to any non-source code on the network client. Calls to bind with object code residing on the server will be effected by the server, ensuring that only certified code is propagated from the server.

One aspect of creating an agent 20 may include partitioning the previously discussed network client's digital signature into smaller object(s) used by the agent(s) 20 to complete their respective tasks. Another aspect of creating an agent may involve network server 14 partitioning payload parameters in order to provide them to the agent(s) 20. The network server may certify the agent 20 as trustable by encrypting the agent with the server's private key prior to propagation. The entire process of creating and dispatching an agent such as agent 20 may be referred to as instantiating an agent.

In an embodiment, the network client 12 is fiscally responsible to the network server 14 for the instantiation of agent 20. For example, the network server 14 may request payment via the FRC 22 for any instantiation of agent(s) that may result from this payload. Once payment authorization is received from the FRC 22, the network server 14 may continue processing the payload. Initially, each instantiation of an agent 20 on each network server 14 is charged for the costs of instantiating, infrastructure and communications resources, and the cost to shut the process, or agent, down at the end of its run. These costs may be determined by the network host 16 and accepted by the network server 14 on behalf of and in accordance with the terms of the network client 12. Each time propagation of an agent occurs, the server is notified and the task identity is updated to reflect the remaining funding level available for the client's requested process. Since terminations and agent failures are also transmitted to the server, the net remaining funding associated with the task identity is reclaimable by the client.

The network server 14 may simulate the execution of the agent 20, allowing the server to estimate the resources required to execute the agent. Servers are encouraged to estimate accurately as hosts may in some embodiments evaluate the accuracy of servers' estimations and provide their evaluations to the FRC. Using the resource requirement, the network server 14 estimates the cost of the execution of agent 20 and verifies the network client's ability to pay via the FRC 22. Once the network server 14 has at least these two pieces of information, the network server 14 may solicit, judge, and accept bids from network hosts 16. The network server 14 may also provide additional information when soliciting bids, such as propagation or time constraints provided within the payload. For example, each agent's needs to replicate and consume resources may be mapped into the final agent object. Further, the network server may provide a profile of the processing required. This profile may indicate the number of requests the agent will make of the network host. For example the profile may indicate: the number of queries, the number of storage/retrieval requests, the number and size of memory allocation requests, the number of transmissions that will be required between the agent and any other member of the network, the number of agents required, the runtime of each agent, and the propagational parameters for the agents. Network hosts 16 may provide bids for the execution of the agent 20 based upon the resource requirements of the agent.

The bids may include charges for a variety of services. For example, a baseline fee may include charges for the instantiation, propagation, termination and infrastructure. A resource utilization fee may include fees for the memory, disk, communication bandwidth, and processor usage. Specialty fees could include processing or output fees for unique services such as output handling, distribution, storage, and processing. The baseline prices could be established by pure market economics. The prices for base services could be available in an electronic market format available to all network servers and network hosts. A network server might take a poll of average rates for similar tasks and initiate bidding with the hosts to negotiate a standard rate for the basic service fees.

In addition to the standard rates that may prevail, other market-driven fees may be assigned by a network host for specialty services. For example, network hosts possessing faster processing ability to reduce total turnaround time could charge a premium for their services. Likewise, network hosts possessing special broadband or data handling capacity could charge more. Network hosts with specialty services such as printing and paper handling, pervasive broadcast or Storage Area Network (SAN) capacity could charge for their specialty services through both a higher normal usage rate as well as standard agent resource consumption. In contrast, hosts providing networks of screen-saver-level processors (i.e., the SETI approach, a scientific experiment that uses Internet-connected computers in the Search for Extraterrestrial Intelligence, wherein users participate by running a free program that downloads and analyzes radio telescope data) could discount their services to the client due to variable processor availability. Likewise, network hosts providing huge-scale data processing sites may discount based on volume.

The network servers 14 may solicit bids from network hosts 16 that are certified as secure, and that are capable of handling the requested processing. This may be accomplished in one of several ways. Two examples include: instant quote or open bid. In either event, the hosts do not know the identity of the client, nor does the client know the identity of the bidding hosts.

Instant quotes challenge interested hosts in returning a quote for the flat cost of running an agent with the execution and resource requirement profiles detailed in the agent. The bid may be limited to a number of propagated instantiations of the agent or agents within the host's resource pool. Alternately, the bid may be limited by time, which, if the data is available to the server, can be calculated. One bidder does not know anything about the other bids; the bids are "sealed."

Open bids are posted for acceptance based on the resource characteristics and constraints of the agent or task. Hosts may be able to see the bid history, but may not know who else is bidding. Nor may the hosts know the actual identity of the client, or the server posting the bid.

The network server 14 determines the most appropriate network host(s) 16 to successfully process the agent 20, keeping in mind the constraints provided by the network client 12 in the payload 30. The network server 14 may or may not have sufficient authority and information to accept a bid and award the agent itself. Thus, additional communication between the network client 12 and the network server 14 and/or the network server 14 and the network host 16 may be necessary to determine which host to award the agent 20. Communication with the FRC may also be necessary to determine which host to award the agent. When the negotiation has ended and a bid is accepted, or enough bids are accepted for the task to be completed, the network server 14 passes on the agent (or set of agents, if standard agents are also needed) to each winning bidder. The network client does not know where the agents are instantiated or which host has what information. Thus, creating a process and triggering its dissemination is a multi-stage process.

Upon receiving the agent 20, the network host 16 may authenticate the agent 20 with the FRC 22. Additionally, the network host may analyze the agent and make a determination as to whether, after winning the bid, it can commit to hosting the agent. For example, the network server may have incorrectly characterized the resource requirements for the agent. Following analysis, the host may in some embodiments elect to decommit to the tasks, and not be financially liable for their execution. If this is due to an incorrect characterization provided by the network server, the host may report unfavorably to the FRC when awarding an accuracy index for this task identity.

Once the network host has determined that it can commit to hosting the package received, it registers with the server, and creates an instantiation of its internal infrastructure to provide the agents with their own segregated processing environment. Communication between the network server and network host handles further agent activities as necessary. For example, data and task progress information, or additional agent dispatching. Minimally, an agent will communicate through its host its arrival, propagation and termination times, along with any relevant data.

Processes terminating normally are noted and may be passed to the network client as a component of the "% complete" concept. If a process, or agent, terminates with a value still held within it, the residual value may be collected for billing resolution at the end of the task. Tasks terminating abnormally may result in a credit added to the task identity if the abnormal termination is due to a host error. Alternately, tasks may terminate abnormally through no fault of the host. Any value remaining after paying the host for the abnormal termination is then returned to the server. This value may be returned within the task identity. In any event, abnormal terminations are reported to the server by the host.

The server has several reporting channels. It reports to the network client on the progress and outcome of the task. It may also report on the management of the task if required. It communicates extensively with the network host. For example, the instantiation, propagation, progress accounting, termination, task termination, financial bidding and reporting may all be communicated between the network server and the network host. The network server reports to the Financial Resolution Center so that the network client can recover unused financial credits. The network server may transmit virtually all communication between the network host and the network client, and much of the communication Each network host 16 has a pre-established relationship with one or more Financial Resolution Centers (FRCs) 22. The network host 16 will continue to authenticate as the agent 20 consumes resources on the host to ensure that the agent has sufficient monetary authority to continue to "live" until the processing completes. In addition to using up allocated billable funding, other conditions cause the termination of an agent. These include, but are not limited to, completion of the task; receipt of a termination request from the client, server, host, or the agent managing the task; performing an illegal or invalid operation; or the detection of security or communication intrusions or irregularities by the "bus" component.

Any output queues are transmitted before the agent terminates, provided the termination is not as the result of abnormal system or environmental conditions. If possible, when termination occurs agents communicate their remaining funding levels to the host. The host may then reduce the running charge for the aggregate agent task by this reported residual amount. The host may reclaim the memory allocated to the agent, as well as any disk space allocated according to the security level dictated by the agent upon registration. When all agents allocated to the task have completed running, the host may shut down any remaining standard agents that may have been supporting the processing on that resource, and returns their residual value before sending a detailed billing record to the FRC.

In FIG. 1 and any other block diagrams appearing herein, the blocks are intended to represent functionality rather than specific structure. For example, it is possible that like computational devices may perform different functions. Implementation of the represented system using circuitry and/or software could involve combination of multiple blocks into a single circuit, device, or program, or combination of multiple circuits, devices, and/or programs to realize the function of a block. Furthermore, a system such as system 10 may include other elements not explicitly shown. For example, multiple servers and/or hosts not shown in FIG. 1 may be included in a system used for implementing the methods described herein. Further, the client, server, host, and/or financial resolution center may themselves include additional elements not shown. Additional elements may include, for example, peripheral devices. Additional elements may also include any combination of clients, servers, hosts, and/or financial centers. For example, a client may also include a host.

A typical computer architecture of a general purpose computational device, such as those shown in FIG. 1, in which the method described herein may be implemented contains one or more central processing units (CPUs) connected to an internal system bus, which interconnects random access memory (RAM), read-only memory, and input/output adapter, which supports various I/O devices, such as printer, disk units, or other devices, such as a sound system, etc. The system bus also connects communication adapters that provide access to communication links. A user interface adapter connects various user devices, such as a keyboard or mouse, or other devices not shown, such as a touch screen, stylus, etc. A display adapter connects the system bus to a display device. A typical operating system may be used to control program execution within the computational device.

As such, computer architecture is clear to those skilled in the art in view of this disclosure, it is not pictured, but merely described above.

Those of ordinary skill in the art will appreciate that the hardware in which the invention is implemented may vary depending on the system implementation. For example, each computational device may have one or more processors, and other peripheral devices or computational devices may be used in addition to or in place of the hardware mentioned above. In addition to being able to be implemented on a variety of hardware platforms, the present invention may be implemented in a variety of software and firmware embodiments.

It is important to note that while the present invention has been described in the context of a fully functioning networking system, those of ordinary skill in the art will appreciate that the processes of the present invention are capable of being distributed in the form of instructions in a computer readable medium and a variety of other forms, regardless of the particular type of signal bearing media actually used to carry out the distribution. Examples of computer readable media include, but are not limited to, media such as EPROM, ROM, tape, paper, floppy disc, hard disk drive, RAM, and CD-ROMs and transmission-type media, such as digital and analog communications links.

It will be appreciated by those skilled in the art having the benefit of this disclosure that this invention is believed to provide a system, method, and program for creating and identifying processes in a heterogeneous network. Further modifications and alternative embodiments of various aspects of the invention will be apparent to those skilled in the art in view of this description. As such, it is to be understood that the form of the invention shown and described is to be taken as exemplary, presently preferred embodiments. Various modifications and changes may be made without departing from the spirit and scope of the invention as set forth in the claims. For example, the system and methods described herein may be implemented using many combinations of hardware and/or software, and at one or more of many different levels of hardware and/or software, as is the case with many computer-related applications. It is intended that the following claims be interpreted to embrace all such modifications and changes and, accordingly, the specification and drawings are to be regarded in an illustrative rather than a restrictive sense.

What is claimed is:

1. A system for bidding for a process execution over a heterogeneous network, said system comprising a network server adapted to receive a payload over the heterogeneous network from a network client, wherein the payload comprises specifications for a process execution associated with a task, wherein the server is further adapted to simulate the process execution by estimating computing resources required to carry out the process execution associated with the task, and provide a bid solicitation for the process execution from a network host.

2. The system as recited in claim 1, wherein the system further comprises a financial resolution center.

3. The system as recited in claim 1, wherein the heterogeneous network comprises a network of computational devices.

4. The system as recited in claim 1, wherein the heterogeneous network is absent information sent thereacross for maintaining secure access thereto.

5. The system as recited in claim 3, wherein the network of computational devices comprises a network of multiple platforms.

6. The system as recited in claim 1, wherein the payload is encrypted.

7. The system as recited in claim 1, wherein the bid solicitation is encrypted.

8. The system as recited in claim 1, wherein providing a bid solicitation comprises providing a process simulation data set.

9. The system as recited in claim 2, wherein the network server is further adapted to receive a bid for the process execution.

10. The system as recited in claim 9, wherein the network server is further adapted to validate the bid with the financial resolution center.

11. The system as recited in claim 10, wherein the network server is further adapted to evaluate the bids.

12. The system as recited in claim 11, wherein evaluating the bids comprises mediating negotiations between the network host and the network client, wherein the negotiations relate to the process execution.

13. The system as recited in claim 12, wherein the network server is further adapted to maintain confidentiality as to the identity of the network client and the network host.

14. A method for soliciting a bid for a process execution associated with a task, said method comprising:
    receiving a payload on a server, wherein the payload comprises specifications for a process execution associated with a task;
    simulating the process execution from the payload by estimating computing resources required to carry out the process execution associated with the task; and
    providing a bid solicitation for the process execution.

15. The method as recited in claim 14, wherein simulating the process comprises executing a portion of the process.

16. The method as recited in claim 14, wherein providing a bid solicitation comprises providing a process simulation data set, and wherein the process simulation data set provides information associated with the process execution related to the task.

17. The method as recited in claim 14, wherein the payload is received from a network client.

18. The method as recited in claim 14, wherein the payload further comprises:
    a security permission dataset related to the identity of the task and the identity of the network client requesting process execution associated with the task;
    and a financial data set related to the budget of the task.

19. The method as recited in claim 18, further comprising validating the payload with a financial resolution center, wherein the financial resolution center is adapted to authenticate the financial data set.

20. The method as recited in claim 14, further comprising receiving a bid from a network host.

21. The method as recited in claim 20, wherein the bid comprises:
    a bid data set relating to the compensation requested in exchange for the process execution;
    a host identity data set relating to the identity of the host providing the bid; and
    a capability data set, wherein the capability data set includes a capability index indicating the host's process execution history.

22. The method as recited in claim 21, further comprising validating the bid with a financial resolution center.

23. The method as recited in claim 14, wherein the payload is encrypted.

24. The method as recited in claim 20, wherein the bid is encrypted.

25. The method as recited in claim 17, wherein the server is unknown to the client.

26. The method as recited in claim 17, wherein the client is unknown to the server.

27. The method as recited in claim 20, wherein the host is unknown to the server.

28. The method as recited in claim 20, wherein the server is unknown to the host.

29. A computer-usable carrier medium, comprising:
    first programming instructions executable on a computational device for receiving a payload wherein the payload comprises specifications for a process to be executed; and
    second programming instructions executable on the computational device for simulating the process specified by the payload by estimating computing resources required to carry out the process execution associated with the task to quantify a bid amount for the process before execution of the process.

30. The carrier medium as recited in claim 29, further comprising third programming instructions executable on the computational device for providing a bid solicitation for the process execution.

* * * * *